UNITED STATES PATENT OFFICE.

DAVID H. WILSON, OF PATERSON, NEW JERSEY, AND SANSOM M. RODGERS, OF PITTSBURGH, PENNSYLVANIA; SAID RODGERS ASSIGNOR TO SAID WILSON.

ALLOY FOR ARC-WELDING.

1,187,411.  Specification of Letters Patent.  Patented June 13, 1916.

No Drawing.   Application filed June 16, 1915, Serial No. 34,402.   Renewed May 10, 1916.   Serial No. 96,538.

*To all whom it may concern:*

Be it known that we, DAVID H. WILSON and SANSOM M. RODGERS, citizens of the United States, and residents, respectively, of Paterson, county of Bergen, State of New Jersey, and Pittsburgh, in the county of Allegheny and State of Pennsylvania, have invented a certain new and useful Alloy for Arc-Welding, of which the following is a specification.

The object of our invention is an alloy for electric welding particularly with an arc. In electric welding with an arc, it has been found that the welding metals employed as electrodes from which metal is transferred to the work, are so affected by the current that the final weld lacks the desirable quality of ductility, strength and toughness.

One of the objects of our invention is an alloy that overcomes these difficulties and provides a weld that retains the ductility, strength and toughness required for successfully joining, repairing or otherwise treating pieces of work so that the weld has characteristics similar to those of the rest of the work.

Another purpose of our alloy is to provide a lower melting point thereby reducing the injurious effect of the heat of the arc upon the welding metal during its transfer across the arc, and reducing the amount of current necessary for welding.

Our invention also includes the method of using our alloy for welding iron or steel.

Our alloy consists preferably of steel or iron containing a comparatively large percentage of an ingredient having manganese like characteristics and a comparatively large percentage of an ingredient having those characteristics of copper capable of reducing the melting point of the welding metal without interfering with the necessary toughness and ductility of the weld (in fact adding thereto). Such an additional element may be copper or its equivalent. Nickel may be mentioned as an equivalent.

Manganese and copper in relatively small quantities (insufficient for our purpose) are common in steel and has therefore been used in welding heretofore. But we believe that we are the discoverers that an excess of manganese and copper or their equivalent in a welding alloy over the amount burned out in the arc has the effect of preserving strength characteristics that are otherwise lost.

Carbon is commonly relied upon to give steel strength and toughness. The welding arc sometimes reduces carbon to almost negligible quantities. The welding arc burns iron when used alone in an electrode for welding. Sufficient carbon, homogeneously mixed with iron in the electrode, helps protect the iron, but it is rapidly burned out by the arc. Manganese has greater powers of resistance to the arc when introduced into the welding alloy. Sufficient manganese protects the carbon somewhat and the iron entirely. Copper in proper quantities in the alloy, reduces the critical (or best) welding temperature without detracting from the toughness of the weld, and helps protect the iron and to slightly protect the carbon. In fact proper quantities of copper (or its equivalent) adds to the ductility, and may add to the thoroughness of the weld, perhaps through its inherent qualities, perhaps by reducing the temperature to which the alloy is subject in the arc.

Our alloy may for purposes of illustration be composed of iron combined with some .60% to 1.00% of manganese and .25% to .40% of copper, with .18% more or less of carbon. Good results are obtained with this alloy with a voltage of 35 and current of 90 amperes or thereabouts with an electrode .15″ diameter. Carbon may also be used in the alloy to any extent desired, generally more or less proportionate to the manganese. These percentages are by no means absolute but are merely an illustration of the embodiment of our invention. The manganese may instead be as low as .50% and from there up to 1.50% without losing the advantages of the use of manganese when used with an arc having a temperature enough only to transfer the metal in a plastic condition. It may be possible, however, to use other percentages of manganese by varying some of the other contents of the alloy, and the temperature of the arc.

We do not intend to limit our invention to the specific proportions above-named nor do we set any specific limits to the field of our invention, for these limits may be varied with the different characteristics required in the weld for different classes of work and for the current employed, the essence of our invention lying in the employment of such an excess of the elements stated that a substantial amount is retained in the weld.

It lies well within the field of our invention to vary the carbon, the manganese and the copper or its equivalent or vary their proportions to each other or to the current or to substitute equivalent materials without departing from the substance of our invention.

While defining manganese and copper as ingredients of our alloy, we do not limit our invention to those metals for any other metals which are substantial equivalents of manganese and copper for the purposes stated may be substituted.

It has been found desirable in arc welding to weld at the lowest arc temperature possible. The lower the arc temperature, the less the arc affects the welding metal and the more evenly the metal flows, making a more uniform, solid and dense weld resulting in greater ductility and toughness. It is therefore the effort of those developing this art to reduce the arc temperature to the lowest point that will accomplish the function of successful welding. Copper assists in this reduction.

The constituents of the alloy are proportioned preferably to secure the lowest temperature in the welding arc which will successfully transfer the metal from the welding electrode to the work and cause it to adhere thereto. The addition of metal which will reduce the melting point of the alloy without decreasing the strength of the weld thus becomes a critical temperature reducing element which has the property of reducing the burning action on the different elements in the welding metal to the extent that they are not so much diminished during the transfer of the welding metal from the electrode to the work.

The burning effect of the arc, and the various imperfections in the weld do not destroy the weld for it is satisfactory in spite of burning and porosity, for some purposes. Our invention aims to so improve the weld and its strength qualities as to widely increase its range of usefulness.

What we claim is:

1. An alloy for electric welding with an arc which is composed of iron homogeneously combined with such an excess of a manganese-like toughening agent as will retain in the welded joint such a quantity thereof as adds a substantial degree of toughness, and an additional element in said combination having copper characteristics capable of substantially reducing the critical welding temperature without impairing the toughness of the weld.

2. An alloy for electric arc welding composed of iron homogeneously combined with such an amount of manganese as to be transferred across an arc without such diminution as would substantially lose the degree of tensile strength and ductility in surrounding steel having boiler plate characteristics; and an additional element in said combination having a copper characteristic capable of substantially reducing the critical welding temperature without materially impairing the toughness of the weld.

3. An alloy for electric welding with an arc which is composed of iron homogeneously combined with such an excess of manganese and copper over the amount burned out in the arc as will retain in the welded joint a substantially additional degree of toughness and ductility due to said excess.

4. An alloy for electric arc welding of iron homogeneously combined with such an amount of manganese as to be transferred across an arc and leave in the weld an excess capable of providing the degree of tensile strength and ductility in surrounding steel having boiler plate characteristics; and copper.

5. An electrode for electric arc welding composed of a homogeneous alloy of iron and of a manganese content of 1.00% or thereabouts and a substantial degree of copper.

6. An electrode for electric arc welding composed of a homogeneous alloy of iron, of manganese and copper in greater quantity than that lost in the arc.

7. An electrode for electric arc welding composed of a homogeneous alloy of iron, about 1.00% of manganese and about .40% of copper.

8. An electrode for arc welding consisting in a homogeneous alloy having manganese and copper contents in excess of .50% manganese and .18% copper.

9. The method of electric welding which consists in transferring welding metal across an arc from an electrode of homogeneous metal having manganese and copper contents substantially in excess of the amounts eliminated by the arc.

10. The method of electric welding which consists in transferring welding metal across an arc from an electrode having a manganese content substantially in excess of the amount lost in the weld, and a copper content substantially reducing the critical temperature.

11. The method of electric welding which consists in transferring welding metal across an arc from an electrode having a manganese content substantially in excess of the amount lost in the weld, and a copper content substantially reducing the critical temperature and increasing the toughness of the weld.

12. The method of electric welding which consists in transferring welding metal across an arc of a current under 60 volts from an electrode having a manganese content substantially in excess of .50%, and a copper content substantially in excess of .18%.

13. The method of electric welding with an arc which consists in transferring welding metal across an arc at its best welding temperature from an electrode having manganese and copper contents in excess of the amounts lost in the weld.

14. The method of electric welding with an arc which consists in transferring welding metal across an arc from an electrode having contents possessing characteristics of manganese and copper with relation to iron in preventing burning of the welding metal.

15. The method of electric welding with an arc which consists in transferring welding metal across an arc from an electrode having contents possessing characteristics of manganese and copper with relation to iron in preventing burning of the welding metal and reducing the critical temperature of welding.

16. The method of electric welding with an arc which consists in transferring welding metal across an arc from an electrode having contents possessing characteristics of manganese and copper with relation to iron in preventing burning of the welding metal and adding toughness to the weld.

17. The method of electric welding with an arc which consists in transferring welding metal across an arc from an electrode having contents possessing characteristics of manganese and copper with relation to iron in preventing burning of the welding metal, reducing the critical temperature of welding and adding toughness to the weld.

Signed at New York in the county of New York and State of New York this 11th day of June, A. D. 1915.

DAVID H. WILSON.
SANSOM M. RODGERS.

Witnesses:
    MYRON F. HILL,
    A. L. TRAVIS.